(12) United States Patent
Maggio

(10) Patent No.: US 11,561,207 B2
(45) Date of Patent: Jan. 24, 2023

(54) NON-DESTRUCTIVE TESTING COUPLANT PROVIDING APPARATUS AND METHOD

(71) Applicant: Sam Maggio, Millport, NY (US)

(72) Inventor: Sam Maggio, Millport, NY (US)

( * ) Notice: Subject to any disclaimer, the term of this patent is extended or adjusted under 35 U.S.C. 154(b) by 230 days.

(21) Appl. No.: 17/118,015

(22) Filed: Dec. 10, 2020

(65) Prior Publication Data

US 2021/0172912 A1    Jun. 10, 2021

Related U.S. Application Data

(60) Provisional application No. 62/946,215, filed on Dec. 10, 2019.

(51) Int. Cl.
*G01N 29/28* (2006.01)
*G01N 29/22* (2006.01)

(52) U.S. Cl.
CPC .......... *G01N 29/28* (2013.01); *G01N 29/225* (2013.01); *G01N 2291/0289* (2013.01); *G01N 2291/267* (2013.01)

(58) Field of Classification Search
CPC ............... G01N 29/28; G01N 29/225; G01N 2291/0289; G01N 2291/267; G01N 29/265; G01N 29/043
See application file for complete search history.

(56) References Cited

U.S. PATENT DOCUMENTS

| | | | |
|---|---|---|---|
| 6,412,133 B1 * | 7/2002 | Erlich | E04H 4/1663 15/1.7 |
| 8,087,298 B1 * | 1/2012 | DiMambro | G01N 29/262 73/644 |
| 10,919,589 B1 * | 2/2021 | Maggio | B62D 55/075 |
| 2005/0072612 A1 * | 4/2005 | Maggio | B62D 55/06 180/21 |

* cited by examiner

*Primary Examiner* — Xin Y Zhong
(74) *Attorney, Agent, or Firm* — Brown & Michaels, PC

(57) ABSTRACT

A device including a reservoir filled with fluid, a frame, and a resilient rolling seal to prevent the fluid from reservoir from escaping, even while the device is moved along a surface. The purpose of this device is to deploy a sensor which is housed within the reservoir. The device is thus capable of maintaining a reservoir of fluid around a sensor or probe and allow the sensor or probe to remain immersed in the fluid, while also remaining in contact with the surface in which the device is moved along. The sensor preferably resides in a fluid couplant of the device. Because the fluid and the sensor reside in the reservoir and because that reservoir is effectively sealed, there is very little loss of fluid, and the amount of fluid needed to conduct testing is dramatically decreased.

17 Claims, 8 Drawing Sheets

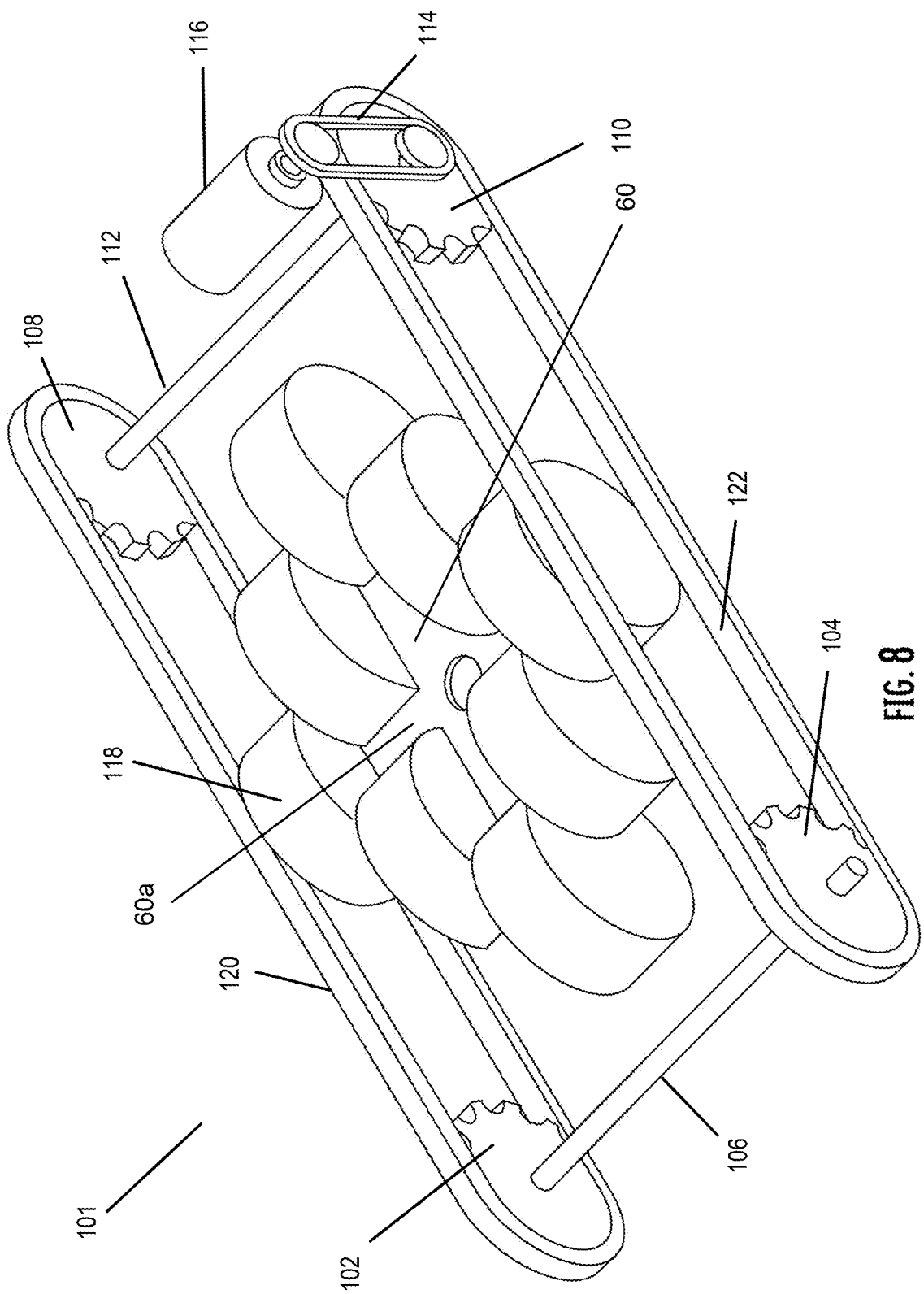

NON-DESTRUCTIVE TESTING COUPLANT PROVIDING APPARATUS AND METHOD

CROSS-REFERENCE TO RELATED APPLICATIONS

This application claims one or more inventions which were disclosed in Provisional Application No. 62/946,215 filed Dec. 10, 2019, entitled "NON-DESTRUCTIVE TESTING COUPLANT PROVIDING APPARATUS AND METHOD". The benefit under 35 USC § 119(e) of the United States provisional application is hereby claimed, and the aforementioned application is hereby incorporated herein by reference.

BACKGROUND OF THE INVENTION

Field of the Invention

The present invention relates generally to the field of non-destructive testing (NDT). More specifically the present invention relates to an apparatus for and methods of providing a couplant, usually water or glycerin (aka fluid), to a surface being tested.

Description of Related Art

Many non-destructive testing technologies (NDT) require water or fluid as a couplant between a sensor and a surface being tested to improve the signal. The couplant displaces the air, making it possible to get more sound energy into the surface being tested so that a usable ultrasonic signal can be obtained. The primary manner in which water couplant is supplied to the surface-to-sensor interface is to spray or pour water out of a tube in front of the sensor. This water/fluid supply needs to be continuous and results in water/fluid pouring all over the surface. This practice also results in a substantial quantity of fluid which needs to be supplied and is consequently used in the process. The amount of fluid used is directly related to the area that is to be tested. The greater the area, the more the fluid. The water/fluid often presents health and safety concerns and invariably must be directed and captured so that it does not present a slip hazard or an electrical/electrocution hazard to workers. This fluid/water also presents a contamination problem particularly in nuclear and other high radiation areas where the water is being used in a contaminated or radioactive area and the water used in these areas must be collected and then treated prior to disposal. On a tank that is 30 feet high and 19 feet in diameter, for example, it is reasonable to assume 200 gallons or more of fluid/water will be needed to pumped up to the sensor that is testing the surface of the tank and that the 200 plus gallons used for testing must then be collected, potentially treated as "contaminated" after it has been utilized in the NDT process.

This conventional approach requires water spray or water pouring nozzles to provide a steady and substantial quantity of fluid/water. However, as stated above, requires significant quantities of fluid/water to be pumped, collected and often treated and this results in high costs, added logistic concerns and additional hardware such as pumps and hoses to pump the water to the NDT test areas and then collection hardware to prevent the fluid/water from spilling onto other equipment or be a hazard.

Waterless NDT approaches have been contemplated. Typically, waterless NDT approaches involve a conductive dry film that is placed between the sensor and the surface with the intent that this conductive dry film will enhance the signal strength in a similar fashion as the water/fluid couplant enhances the signal strength. Waterless NDT has had marginal to little success. To date, nothing works as effectively as water or fluid to optimize signal strength within the field of non-destructive testing (NDT) of surfaces, particularly NDT involving ultra-sound.

SUMMARY OF THE INVENTION

In an embodiment, a device has a reservoir of fluid that is moved along a surface and does not leak. The reservoir is contained by a chamber that is bounded in part by a rolling resilient seal. This allows an NDT probe/sensor to remain in the chamber of fluid to facilitate the fluid as a couplant. Since the chamber is essentially sealed, significantly less fluid is required for NDT testing, as well as eliminating the need for collection of any contaminated fluid.

BRIEF DESCRIPTION OF THE DRAWING

FIG. 8 is a bottom perspective view of a device with the seal configuration depicted in FIG. 7.

DETAILED DESCRIPTION OF THE INVENTION

Figure 1:
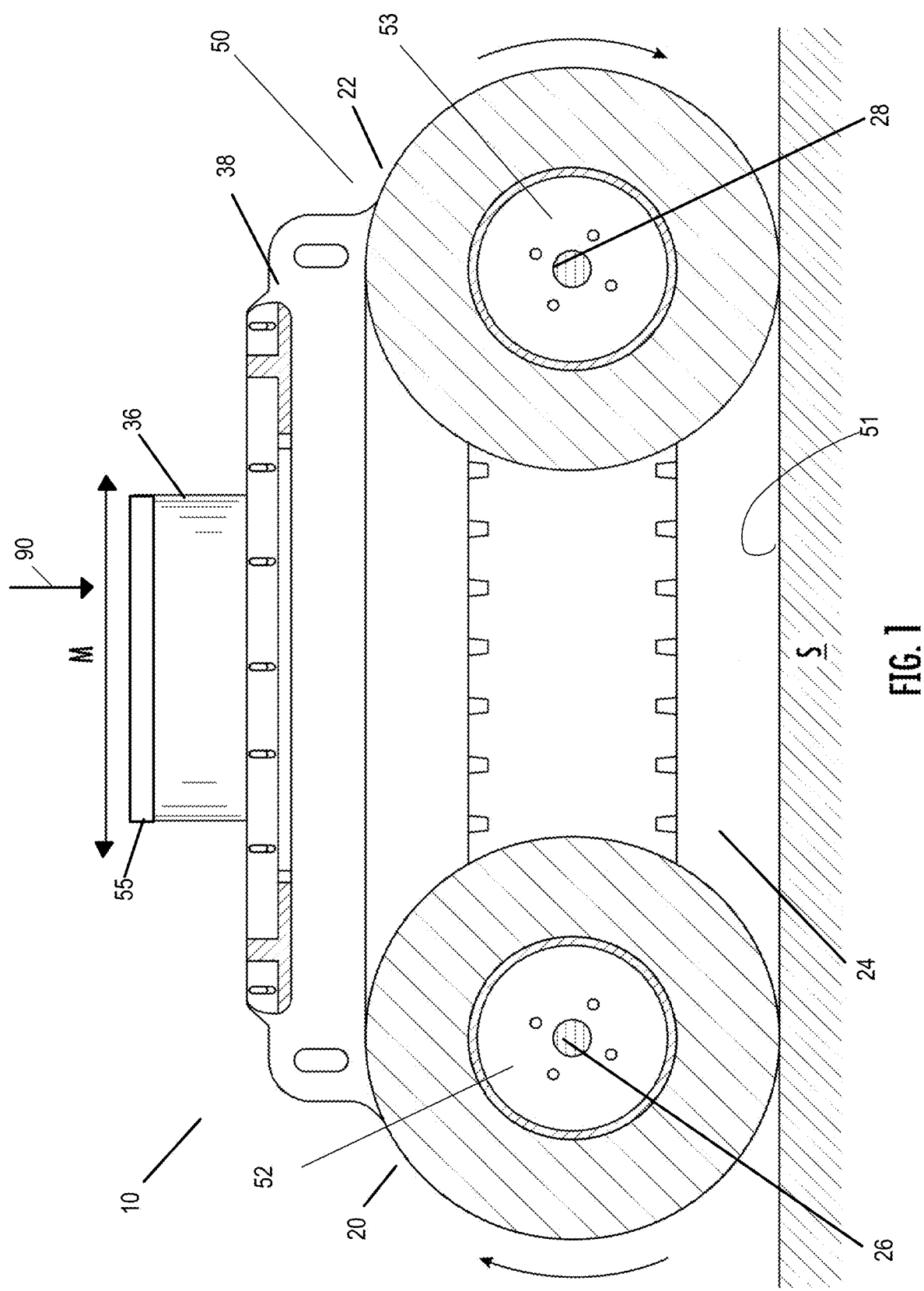
FIG. 1 shows a cross-sectional schematic side view of a device adhering to an exemplary surface.
Figure 2B:
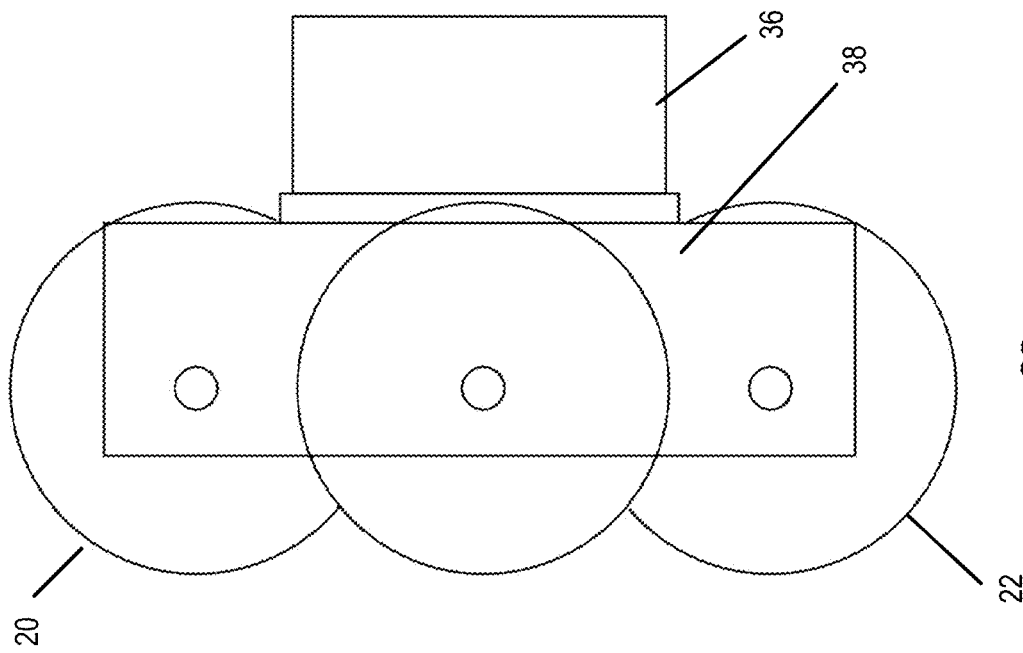
FIG. 2B shows a top view of the rolling seal assembly.
Figure 2A:
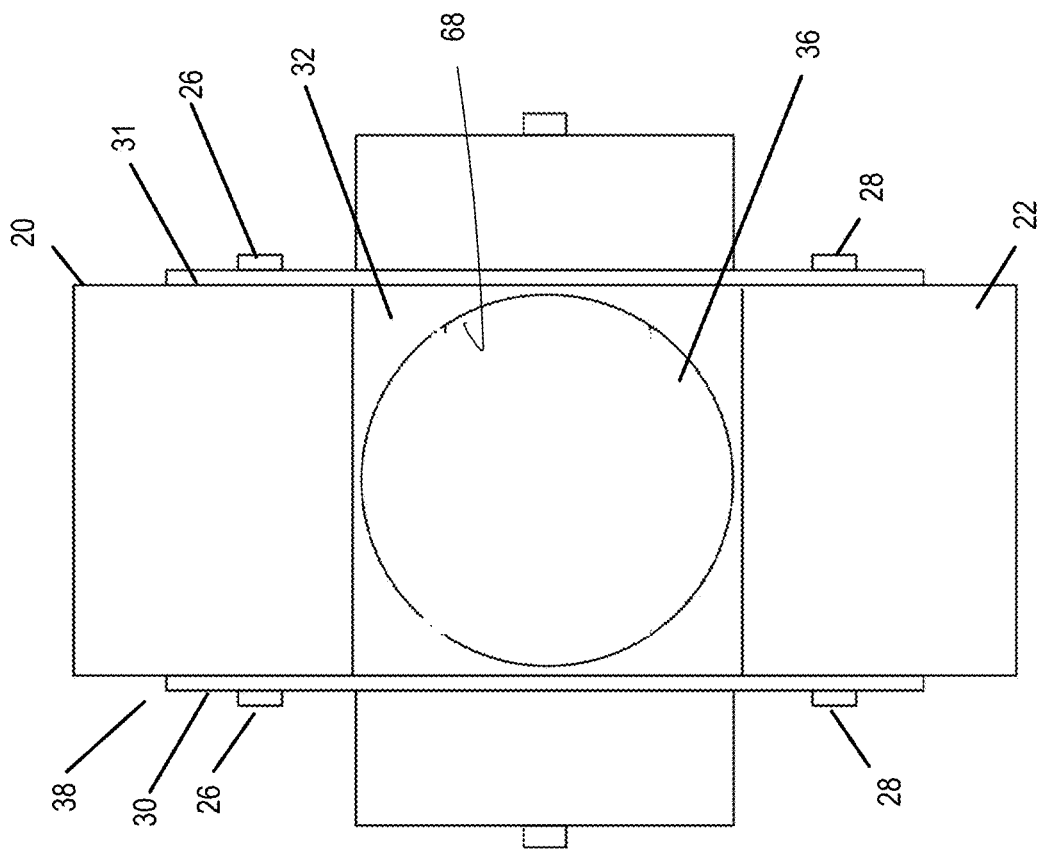
FIG. 2A shows a schematic side view of the rolling seal assembly.
Figure 3:
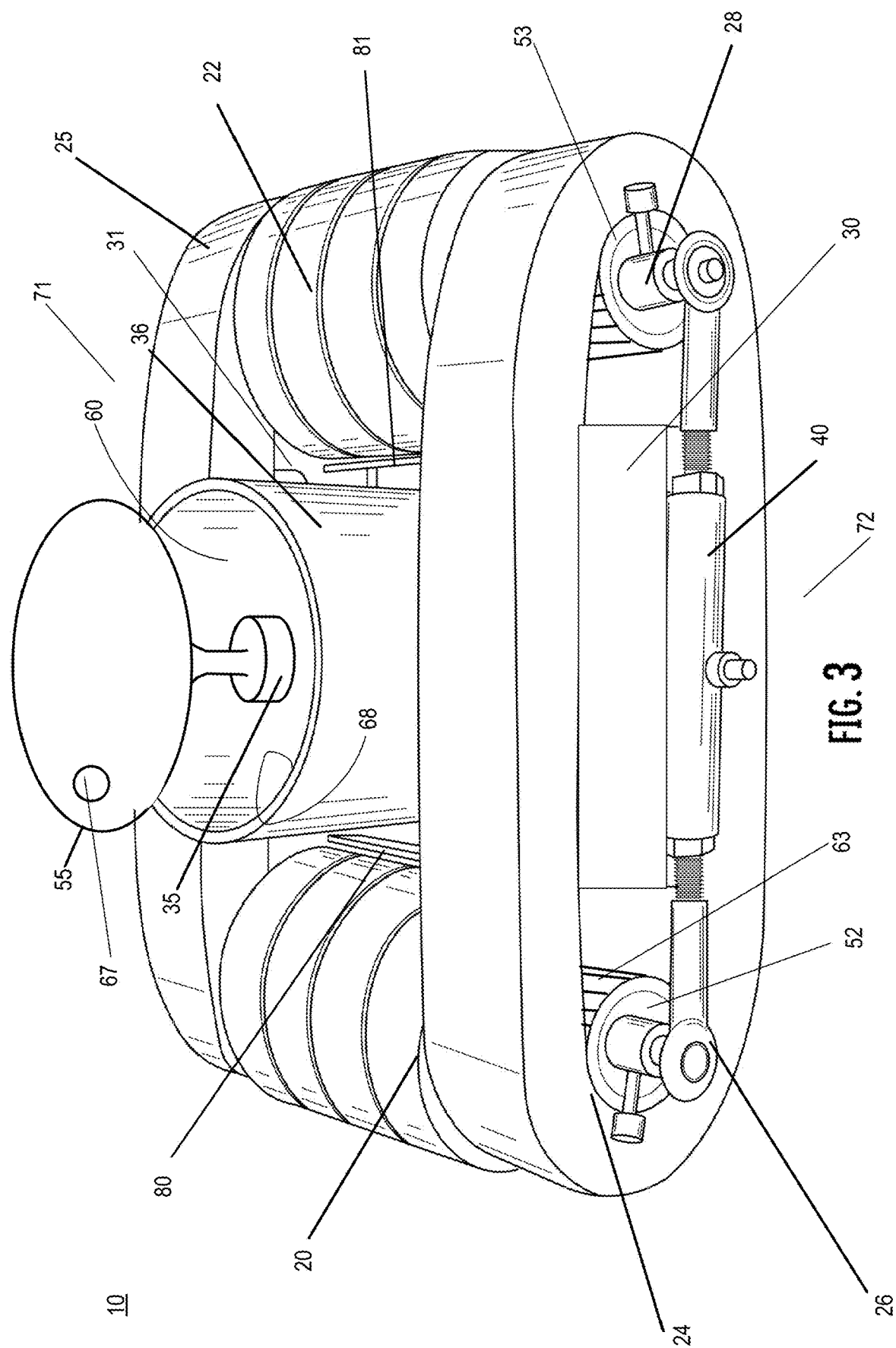
FIG. 3 shows a perspective view of the device.
Figure 4:
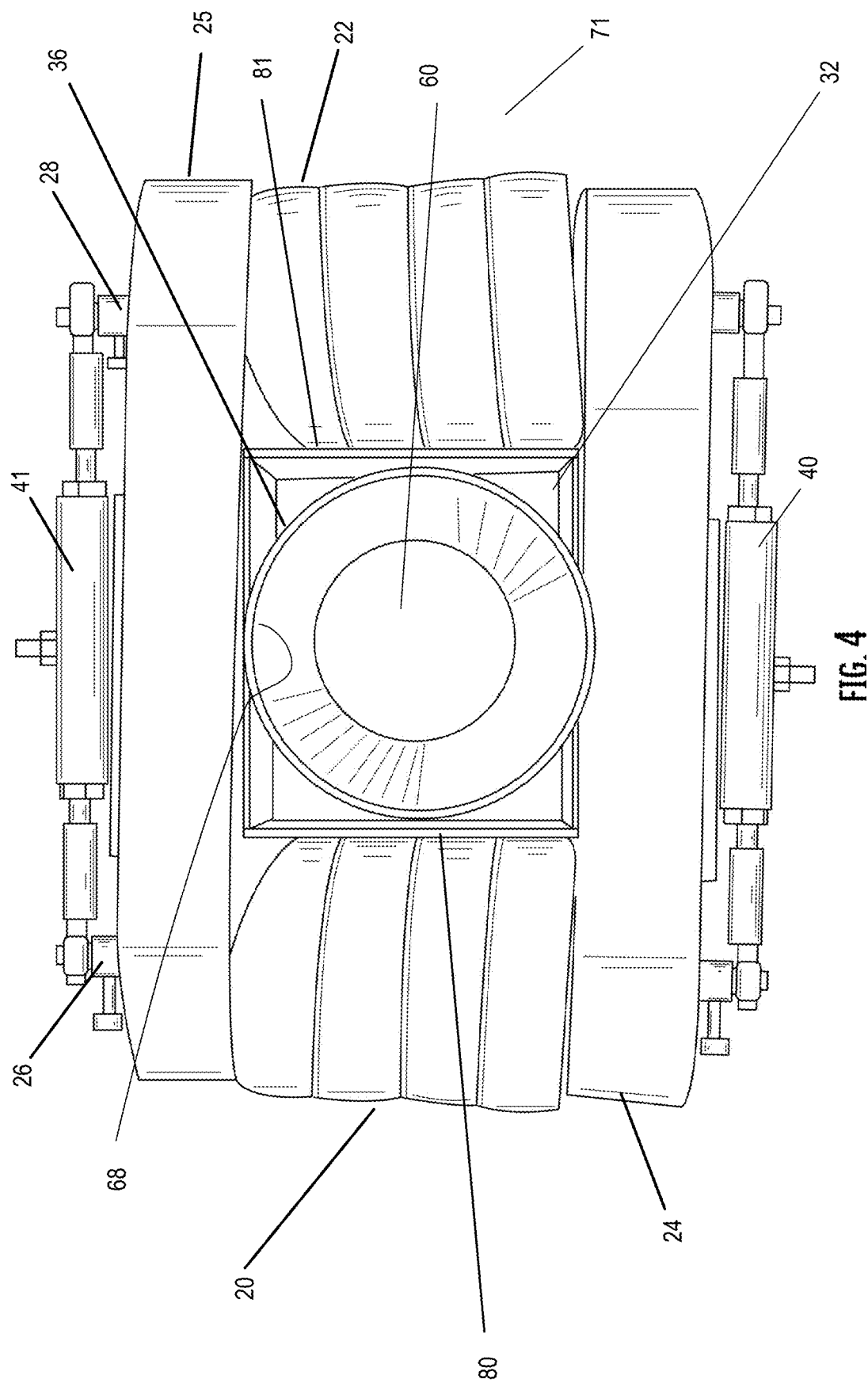
FIG. 4 shows a top view of the device.
Figure 5:
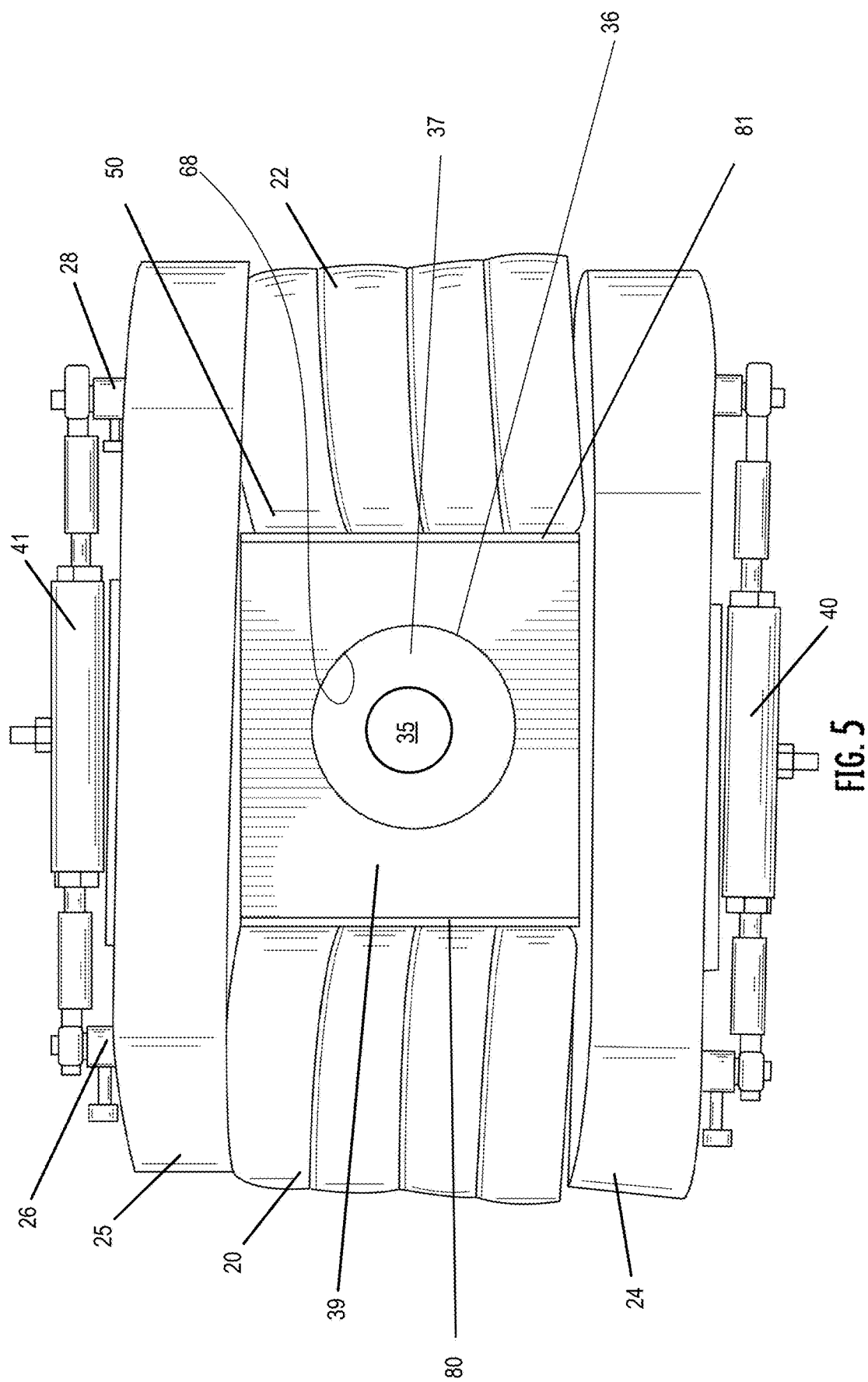
FIG. 5 shows a bottom view of the device.

Referring to FIGS. 1-5, a device or apparatus 10 has a reservoir 36 filled with fluid couplant 37 and mounted to a frame 38 in which first and second rollers 20, 22 are attached to form a rolling seal assembly 50 together with resilient roller tracks 24, 25 resulting in a rolling seal 51 to prevent the egress of fluid couplant 37 from the reservoir 36 from escaping, even while the device 10 is moved along a surface S. The first roller 20 is mounted to first axle 26 of a first roller shaft 52 and the second roller 22 is mounted to a second axle 28 with a second roller shaft 53. The first axle 26 and the second axle 28 are connected to each other via a rod 40, 41 on either side of the device 10. The rods 40, 41 are mounted to the frame 38. The first and second rollers 20, 22 are flanked by a first roller track 24 and a second roller track 25 rotatable about first and second roller shafts 52, 53. The resilient roller tracks 24, 25 may also be a toothed belt (see FIG. 1) and the first and second roller shafts 52, 53 can include grooves 63. The device 10 is preferably bidirectional as indicated by double sided arrow M.

A frame 38 of the device 10 has a first side plate 30, a second side plate 31, a front side plate 80, a back side plate 81, a top side plate 32, and a bottom side plate 39. The first side plate 30 and the second side plate 31 are each connected to the top side plate 32, bottom side plate 39, front side plate 80 and back side plate 81. The front side plate 80 seals against the first roller 20. The back side plate 81 seals against the second roller 22.

Attached to the top side plate 32 of the frame 38 is a reservoir 36. A lid 55 is received by the reservoir 36. It should be noted that the shape of the reservoir 36 is not limited to that shown in the Figures. The reservoir 36 can be cylindrically shaped, square shaped or a combination of shapes. The reservoir 36 internally defines a chamber 60. The chamber 60 extends from a top 71 of the device 10 to a bottom 72 of the device 10, with the bottom 72 of the device being closed to the surface S when in use during surface testing.

More specifically, the chamber 60 is defined by the internal walls 68 of the reservoir 36, the first side plate 30 of the frame 38, the second side plate 31 of the frame 38, the top side plate 32 of the frame 38, the lid 55, the bottom side plate 39 of the frame 38, first and second rollers 20, 22, back side plate 81 and front side plate 80, and resilient roller tracks 24, 25 of a resilient rolling seal assembly 50 described in further detail below and the surface S in which the device 10 is engaged with for surface testing. The device 10 therefore includes a fluid chamber 60 consisting of a frame 38, a reservoir 36 and a rolling, flexible, resilient seal 51 formed by the rolling seal assembly 50 between the frame 38 and the surface S, and the surface S itself, as the rolling seal 51 is engaged to the surface S, and force 90 is applied on the device 10 and towards the surface S, thereby containing the fluid couplant 37 even as the device 10 is moved along the surface S and forming a seal 51 so that no fluid exits from the chamber 60.

Within the chamber 60 is a sensor 35 present within a fluid couplant 37. As previously described, the chamber 60 containing the fluid couplant 37 and defined by the reservoir 36 is generally bounded by the frame 38, the top side plate 32, the lid 55, the surface S and the elements that make up the resilient rolling seal assembly 50. The rolling seal assembly 50 is comprised of first and second rollers 20, 22 on either end of the device 10 and resilient roller tracks 24, 25 on either side of the device 10. The rolling seal assembly 50 surrounds the reservoir 36 and provides a seal 51 relative to the surface S when the bottom 72 of the device 10 is placed adjacent the surface S. Thus, the rolling seal assembly 50 forms a resilient seal 51 preventing fluid from leaking out of the chamber 60 of the reservoir 36 between the chassis or frame 38 and the surface S being traversed.

The resilient rolling seal 51 is generally defined by a seal perimeter where the first and rollers 20, 22 and resilient roller tracks 24, 25 contact the surface S being traversed. Additionally, the seal 51 partially defines the chamber volume of the reservoir 36 at the bottom 72 of the device 10 that maintains a closed, leak-free or nearly leak-free chamber 60. Since the device 10 rolls along the surface S with the chamber 60 of the reservoir 36 in contact with the surface S, some amount of wetting of the surface S will occur thus some loss very slight amount of fluid couplant will be consumed. A second reservoir (not shown) to supply fluid to the chamber 60 of the reservoir 36 of the device 10 is envisioned to maintain an adequate amount of fluid for the device during operation.

The sensor 35 is preferably a non-destructive testing (NDT) sensor and is contained within the chamber 60 of the reservoir 36 and thusly immersed in a fluid couplant 37 of a fluid or water the entire time the device 10 is pressed against the surface S. Another reservoir (not shown) of the same fluid is attached via tube or other means of conveyance to the chamber 60 of the reservoir 36 and thus keeps the reservoir 36 in the device 10 full of fluid couplant 37. For example, the lid 55 may contain an orifice 67 (see FIG. 3) for accepting a tube connecting to a supply of fluid couplant 37. The chamber 60 defined by the reservoir 36 is preferably provided with fluid couplant 37 to keep the amount of fluid couplant 37 at a predetermined level, ensuring that the sensor 35 remains within the fluid couplant 37 to enhance signal strength from the surface S being tested.

The device 10 is thus capable of holding a chamber 60 of fluid couplant 37 around the sensor or probe 35 and allows the sensor or probe 35 to remain immersed in the fluid couplant 37 and also remain in contact with the surface S. The sensor 35 resides in the fluid couplant 37 because the fluid couplant 37 and the sensor 35 reside in this chamber 60 and since the chamber 60 is effectively sealed, there is very little loss of fluid therefore very little amount of fluid couplant 37 is needed to conduct testing. The sensor 35 records data to allow evaluation of the properties of a material, component, structure or system associated with the surface S for characteristic differences or welding defects and discontinuities without causing damage to the original part with surface S.

The device 10 also overcomes weld seams or other surface irregularities of the surface S as the sensor or probe 35 is moved along the surface S, without losing a significant amount of fluid couplant 37. It should be noted that the lid 55 is only shown in FIGS. 1 and 3 and not shown in FIG. 4 in order to show a portion of the chamber 60 present within the reservoir 36.

Figure 6:
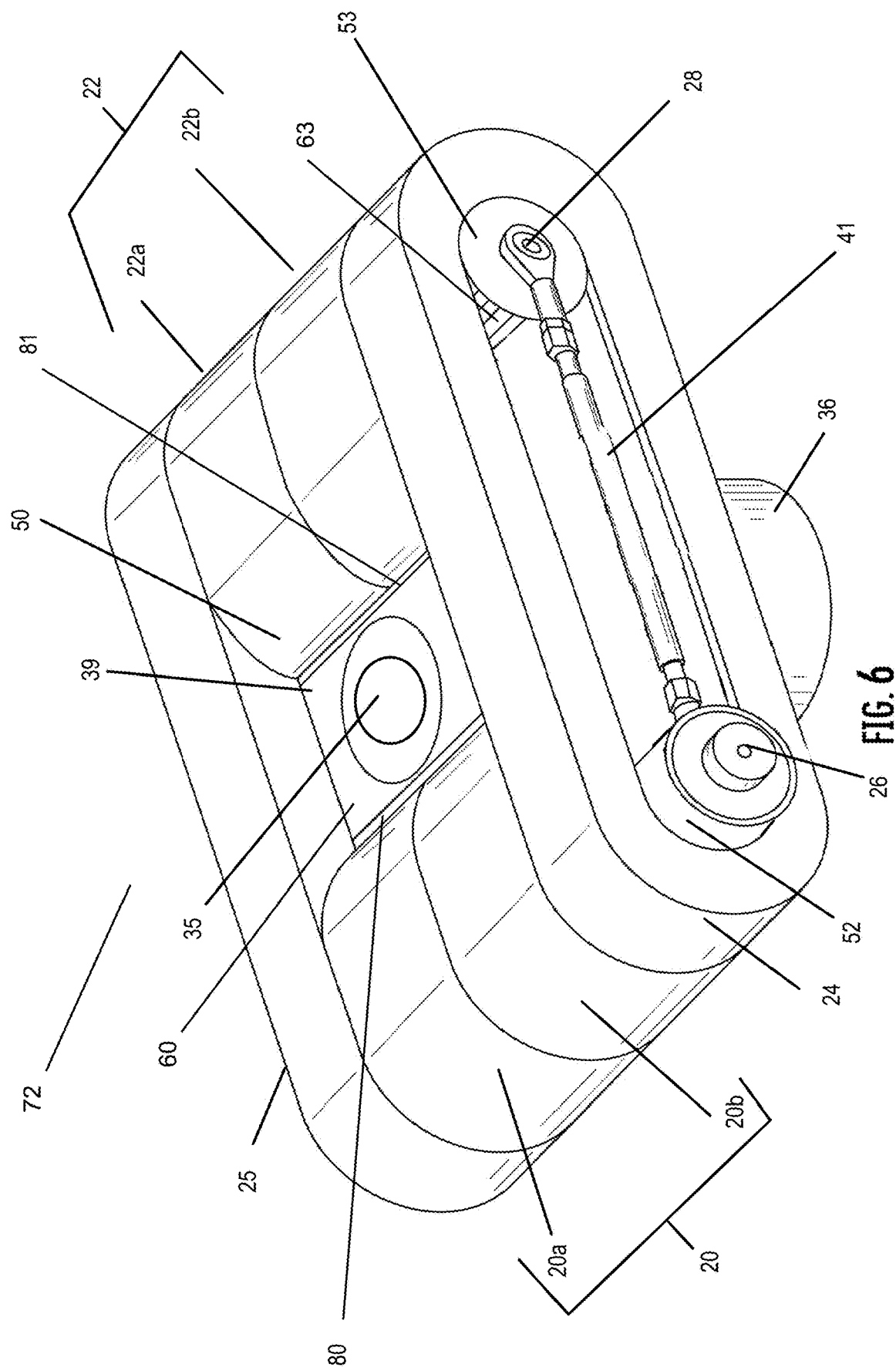
FIG. 6 shows a perspective bottom view of a device of an alternate embodiment.

FIG. 6 shows an alternate embodiment of device 10 in which the first roller 20 is split into a first side roller 20a and a second side roller 20b and the second roller 22 is split into a first side roller 22a and a second side roller 22b. The first side roller 20a, 22a and the second side roller 20b, 22b can move in opposite directions while not interfering with or dragging on the other. The rollers 20a, 20b, 22a, 22b are flanked by resilient roller tracks 24, 25 which may be highly resilient or slightly resilient, and continuous or segmented, to form a continuum attached to an endless belt. Rotation of the endless belt causes the first side roller 22a, 20a second side roller 20b, 22b, and resilient roller tracks 24, 25 to roll. It is noted that in this embodiment, the first roller shaft 52 and the second roller shaft 53 include grooves 63 which engage with the resilient roller tracks 24, 25 and the rollers 20a, 20b, 22a, 22b. It is noted that the front side plate 80 seals against the first roller 20 including a first side roller 20a and a second side roller 20b and the back side plate 81 seals against the second roller 22 include a first side roller 22a and a second side roller 22b.

The resilient seal 51 is therefore formed with the rollers 20a, 20b, 22a, 22b, resilient roller tracks 24, 25 and the surface S as force 90 is applied on the device 10 and towards the surface S, thereby containing the fluid couplant 37 even as the device 10 is moved along the surface S and forming a seal so that no fluid exits from the chamber 60.

Figure 7:
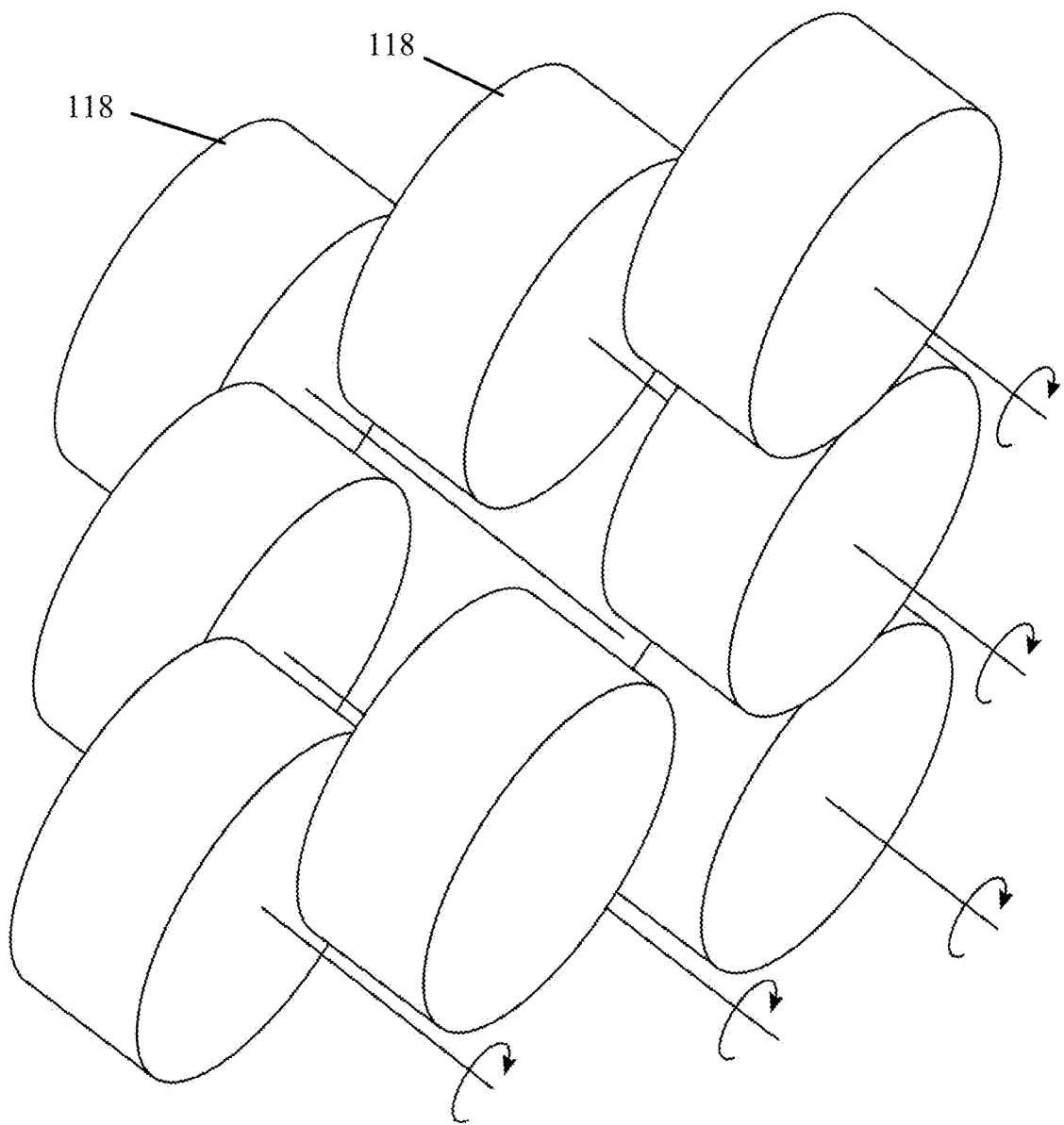
FIG. 7 is a schematic diagram depicting a seal configuration according to another embodiment.

In other embodiments, the first and second rollers 20, 22 can be segmented circumferentially into a plurality of individually independently movable sealing elements 118 as shown in FIGS. 7-8.

FIG. 7 shows an alternative configuration for the seal 50 as including a plurality of individual seal elements 118 arranged in an overlapping sealing configuration. The plurality of individual seal elements 118 form a resilient seal having a seal perimeter that can range over any two-dimensional substantially closed shape. Thus, the shape of the seal's boundary can be polygonal, arcuate, combinations thereof or any other suitable shape that facilitates substantially rolling contact with the surface S being traversed.

FIG. 8 shows an exemplary embodiment in which the resilient rolling seal assembly 150 is made up of rolling elements 118 such as those depicted in FIG. 7 that are arranged in a substantially diamond shaped configuration. The rolling elements 118 are not powered and do not provide the driving force for the device 101 of this embodiment. A motor assembly 116 is used to actively drive one or more axles 106, 112 via a belt 114. Tracks and/or rollers 120, 122 can be mounted on the axles 106, 112 via sprockets 102, 104, 108, 110 in order to move the device 101 across a surface. In some embodiments, a second motor can be included. Thus, the device 101 can locomote across a surface S. The motor 83 or other suitable drive system drives the overall device 101.

In this embodiment, similar to that shown in FIGS. 1-6, a reservoir 36 of fluid couplant 37 is present within the device 101, with a sensor 35 present within the fluid couplant 37. The chamber 60 would be defined by a frame, for example frame 38 with a first side plate 30, a second side plate 31, a top side plate 32 connected to the first and second side plates 30, 31, a lid 55, and a bottom side plate 139. Attached to the top side plate 32 of the frame 38 is a reservoir 36 which internally defines a portion of a chamber 60. The chamber 60 extends from a top 71 of the device 101 to a bottom 72 of the device 101.

More specifically, the chamber 60 is defined by internal walls 68 of the reservoir 36, the first side plate 30 of the frame 38, the second side plate 31 of the frame 38, the top side plate 32 of the frame 38, the lid 55, the bottom side plate 139 of the frame, a front side plate 80 of the frame, a back side plate 81, and the plurality of individual rolling elements 118 and the surface S in which the device 101 is engaged with for surface testing. At least a part of the frame 38 seals against the resilient rolling elements 118.

The device 101 therefore includes a fluid chamber 60 consisting of a frame 38, a bottom side plate 139, a front side plate 80, a back side plate 81, a reservoir 36 and a plurality or rolling elements forming a resilient seal, and the surface S itself, as the rolling elements 118 and thus the rolling seal 51 is engaged to the surface S, thereby containing the fluid couplant 37 even as the device 101 is moved along the surface S and forming a seal 51 so that no fluid exits from the chamber 60.

As in the first embodiment, within the chamber 60 is a sensor 35 present within a fluid couplant 37. The plurality of rolling elements 118 of the resilient rolling seal assembly 150 surrounds the reservoir 36 and provides a seal 51 relative to the surface S when the bottom of the device 101 is placed adjacent the surface S. Thus, the rolling seal assembly 150 forms a resilient seal 51 preventing fluid from leaking out of the chamber 60 of the reservoir 36 between the chassis or frame 38 and the surface S being traversed.

In another embodiment, the device can include a resilient front wheel or roller, a resilient rear wheel or roller, and two resilient side wheels or tracks. The sealed area 60a between the rollers and/or tracks forms a partition which can be shaped as a rectangle, square, polygon or suitably shaped region to form a chamber 60 which receives a sensor and is part of the chamber 60. The side seal wheels or rollers are resilient, compliant and continuous or segmented to form a continuum and thus a seal when placed relative to a surface S. When downward force is applied to the device, the side wheels deform and thusly form a seal so that no fluid exits from the chamber.

The device 10, 101 readily and reliably rolls along a surface S and overcomes surface irregularities without loss of fluid because of the resilient rolling seal 51. The allows the device 10, 101 to proceed along a surface S and maintain a resilient rolling seal 51 without significant loss of fluid regardless of how rough the surface or if it has irregularities in the surface S. Riding over welded seams found on most tanks or piping in industry is something the resilient seal of the device can readily negotiate and maintain a leak proof seal.

If there are large obstacles on the surface S, the device 10, 101 can be simply lifted off the surface S, since a large obstacle cannot be NDT tested anyway. In an embodiment, a fluid feed hose from a supply source or second reservoir will close to prevent drainage of all the fluid from the chamber 60, 160 when the device 10, 101 is lifted from the surface S and it will reopen when the device 10, 101 is again placed back on the surface S thereby refilling the chamber 60 of the device 10, 101.

The device 10, 101 can be powered or unpowered.

The device 10, 101 may be deployed manually, as by a human, or by robot or machine or by some other method.

It should be noted that because the seal of the devices 10, 101 are rolled and not dragged, friction and wear are minimal.

The fluid couplant 37 can be water, glycerin or another fluid.

The NDT testing is carried out by first affixing the sensor 35 within the reservoir 36 and chamber 60 of the device 10, 101, for example by affixing the sensor 35 to the lid 55. Although other means of attaching the sensor 35 within the device 10, 101 can be used. Next, the chamber 60 and reservoir 36 are filled with fluid a to a predetermined level. The fluid may be water, glycerin, or other fluid. The device 10, 101 is then placed such that the bottom side plate 39, 139 of the device 10, 101 is placed adjacent the surface S to be tested and any rollers 20, 22, plurality of individual rolling elements 118, and/or tracks 24, 25 are placed in contact with the surface S to be tested. The device 10, 101 is then rolled across the surface S by applying pressure on the device 10, 101 to maintain a resilient rolling seal 51 between the device 10,101 and the surface S. Data is collected by the sensor 35 as the device 10, 101 is rolled relative to the surface S.

The rolling seal of embodiments of the present invention define a chamber within a reservoir that has a fluid couplant which reduces the amount of effort or energy needed to move the device with an NDT sensor or probe along a surface. Since the fluid is contained within the reservoir and in use consumes very little fluid, the hardware and costs associated with supply substantial amount of fluid/water for the NDT sensor or probe is dramatically decreased. Furthermore, the many logistic problems associated with supplying a large amount of fluid or water is also significantly reduced.

Embodiments of the present invention dramatically expand the range of applications for NDT testing. Embodiments of the present invention have considerable commercial value since the usefulness of NDT can be expanded and the costs and difficulties of supplying large quantities of fluid/water can be virtually eliminated. The rolling seal assembly can be used in combination with conventional wheels or tracks that independently locomote the apparatus while the rolling seal of this invention performs the sealing of the chamber or reservoir to prevent loss of fluid or water.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A device for non-destructive testing on a surface comprising:
    a frame having a first side plate, a front side plate, a back side plate, a second side plate, a top side plate, and a bottom side plate, the top side plate and the bottom side plate each connected to the first side plate, the front side plate, the back side plate and the second side plate;
    a resilient rolling seal assembly between the first side plate and the second side plate and the front side plate and the back side plate, below the top side plate, and adjacent the bottom side plate of the frame adapted to form a seal relative to the surface during non-destructive testing of the surface, the resilient rolling seal assembly comprising:
    a first axle;
    a second axle, the first axle and the second axle connected together through at least one rod mounted to the first side plate and the second side plate of the frame;
    a first roller shaft mounted to the first axle;
    a second roller shaft mounted to the second axle;
    at least one first rotatable roller mounted to the first roller shaft and adjacent the bottom side plate and the front side plate;
    at least one second rotatable roller mounted to the second roller shaft and adjacent the bottom side plate and the back side plate;
    a first roller track rotatable about the first roller shaft and the second roller shaft, flanking the at least one first rotatable roller and the at least one second rotatable roller on a first side and the first side plate of the frame;
    a second roller track rotatable about the first roller shaft and the second roller shaft, flanking the at least one first rotatable roller and the at least one second rotatable roller on a second side and the second side plate of the frame;
    a fluid reservoir defining a chamber having fluid couplant defined by at least the resilient rolling seal assembly, the first side plate, the second side plate, the bottom side plate, the front side plate, the back side plate, and the top side plate of the frame;
    a non-destructive testing sensor received within the fluid reservoir and adapted to remain immersed within the fluid couplant and in contact with the surface as the resilient seal assembly of the non-destructive testing device rotatably moves across the surface during non-destructive testing of the surface.

2. The device of claim 1, wherein the first rotatable roller comprises at least two rotatable rollers and the second rotatable roller comprises at least two rotatable rollers.

3. The device of claim 1, wherein the first roller shaft and the second roller shaft further comprise grooves.

4. The device of claim 1, further comprising a lid for the reservoir.

5. The device of claim 4, wherein the lid further comprises an orifice for receiving a supply of fluid couplant.

6. The device of claim 4, wherein the non-destructive testing sensor is mounted to the lid.

7. The device of claim 1, wherein the fluid couplant is water.

8. The device of claim 1, wherein the fluid couplant is glycerin.

9. A device for non-destructive testing on a surface comprising:
    a frame having a first side plate, a front side plate, a back side plate, a second side plate, a top side plate, and a bottom side plate, the top side plate and the bottom side plate each connected to the first side plate, the front side plate, the back side plate and the second side plate;
    a resilient rolling seal assembly between the first side plate and the second side plate and between the front side plate and the back side plate, below the top side plate and adjacent the bottom side plate of the frame adapted to form a seal relative to the surface during non-destructive testing of the surface, the resilient rolling seal assembly comprising:
    a first axle having a first end and a second end;
    a second axle having a first end and second end, parallel to the first axle;
    a first pair of sprockets mounted to the first end and the second end of the first axle;
    a second pair of sprockets mounted to the first end and the second end of the second axle;
    a first roller track adjacent the first side plate rotatably connecting the first pair of sprockets to the second pair of sprockets together on a first side;
    a second roller track adjacent the second side plate rotatably connecting the first pair of sprockets to the second pair of sprockets together on a second side;
    a plurality of rolling elements configured into a shape such that the plurality of rolling elements defines a sealed area with the bottom side plate, the front side plate, and the back side plate and relative to the surface;
    a motor assembly coupled to at least one of the first pair of sprockets or the second pair of sprockets to actively drive either the first axle or the second axle;
    a fluid reservoir defining a chamber having fluid couplant defined by the sealed area or the resilient rolling seal assembly, the first side plate, the second side plate, the bottom side plate and the top side plate of the frame;
    a non-destructive testing sensor received within the sealed area and a chamber adapted to remain immersed within the fluid couplant and in contact with the surface as the resilient seal assembly of the non-destructive testing device rotatably moves across the surface during non-destructive testing of the surface.

10. The device of claim 9, wherein the sealed area is selected from a shape consisting of:
    rectangle, square, polygon, t-shaped, and diamond.

11. The device of claim 9, wherein the first roller track and the second roller track are toothed belts.

12. The device of claim 9, wherein the fluid couplant is water.

13. The device of claim 9, wherein the fluid couplant is glycerin.

14. The device of claim 9, further comprising a lid for the reservoir.

15. The device of claim 14, wherein the lid further comprises an orifice for receiving a supply of fluid couplant.

16. The device of claim 14, wherein the non-destructive testing sensor is mounted to the lid.

17. A method of non-destructive testing on a surface with a device, the device comprising: a frame having a first side plate, a front side plate, a back side plate, a second side plate, a top side plate, and a bottom side plate, the top side plate and the bottom side plate each connected to the first side plate, the front side plate, the back side plate and the second side plate; a resilient rolling seal assembly between the first side plate and the second side plate and the front side plate and the back side plate, below the top side plate, and adjacent the bottom side plate of the frame adapted to form a resilient rolling seal relative to the surface during non-destructive testing of the surface; a fluid reservoir defining a chamber having fluid couplant defined by at least the resilient rolling seal assembly, the first side plate, the second side plate, the bottom side plate, the front side plate, the back side plate, and the top side plate of the frame; a non-destructive testing sensor received within the fluid reservoir and adapted to remain immersed within the fluid couplant and in contact with the surface as the resilient seal assembly of the non-destructive testing device rotatably moves across the surface during non-destructive testing of the surface, the method comprising:

affixing a sensor within the chamber;
 filling the chamber with fluid;
 placing the resilient seal assembly of the device adjacent the surface; and
 applying pressure on the device relative to the surface, such that a resilient rolling seal is formed between the surface and the device.

\* \* \* \* \*